Jan. 12, 1965   P. H. PACAULT   3,164,958
COMBINED GAS-STEAM TURBINE CYCLE POWER PLANT
Filed April 14, 1961   3 Sheets-Sheet 1

INVENTOR.
Pierre Henri Pacault
BY
ATTORNEY

United States Patent Office 3,164,958
Patented Jan. 12, 1965

3,164,958
COMBINED GAS-STEAM TURBINE CYCLE
POWER PLANT
Pierre Henri Pacault, Paris, France, assignor to Babcock
& Wilcox, Limited, London, England, a corporation
of Great Britain
Filed Apr. 14, 1961, Ser. No. 103,077
Claims priority, application France Apr. 23, 1960
1 Claim. (Cl. 60—39.18)

This invention relates to installations for the generation of energy in a combined gas-steam turbine cycle power plant of the type comprising at least one steam generating unit feeding a steam turbine in combination with an air compressor and a pressurized furnace feeding a gas turbine.

The invention essentially consists in raising the overall efficiency of such installations appreciably by employing steam bled from the steam cycle to preheat air for use in the gas cycle. Thus it is characterized by the fact that in the air circuit there is provided, between the compressor and the entrance to the pressurized furnace, at least one heat exchanger in which the air is preheated by steam which is extracted from the steam turbine. The steam is desuperheated and possibly partially condensed while it preheats the air.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 1:
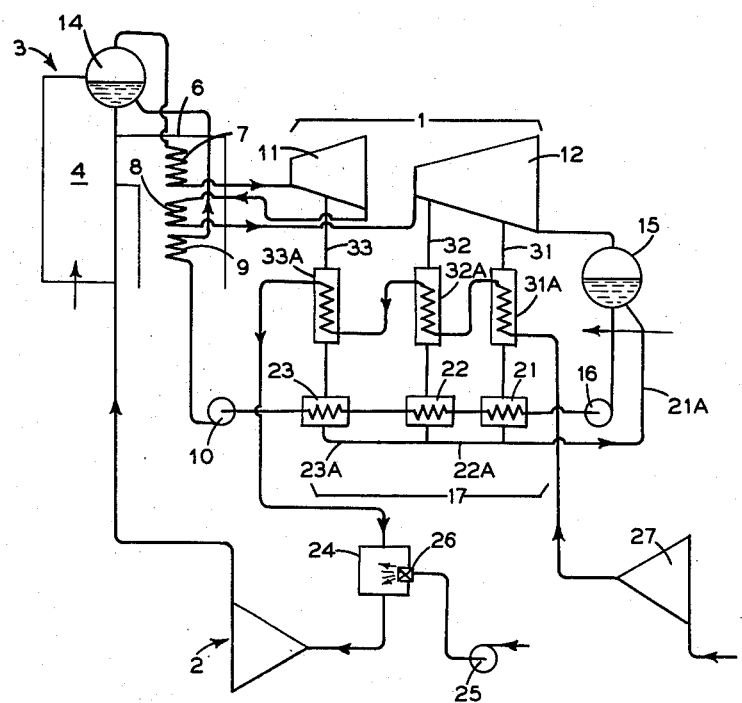
Figure 2:
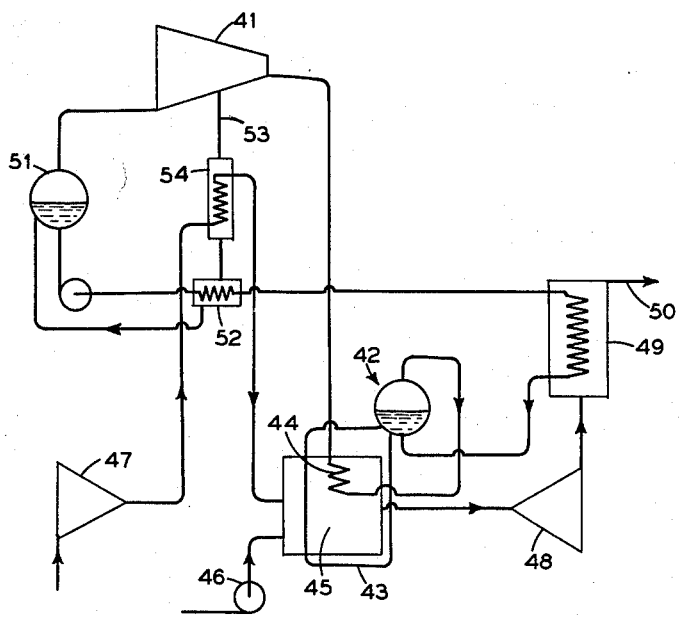
Figure 3:
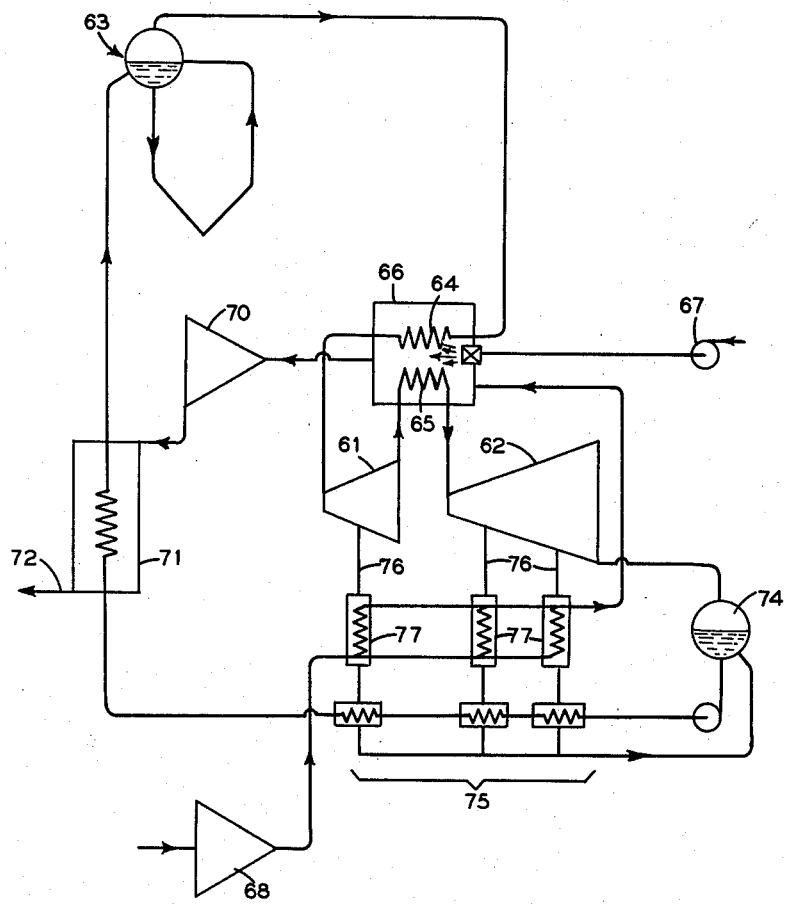

Of the drawings:

FIG. 1 diagrammatically illustrates a gas-steam turbine cycle power plant embodying the present invention;

FIG. 2 diagrammatically illustrates another power plant arrangement similar to the one shown in FIG. 1 which embodies the present invention; and FIG. 3 diagrammatically illustrates still another power plant arrangement similar to the one shown in FIG. 1 which embodies the present invention.

In the embodiment selected for and shown in FIG. 1 a power plant comprises a steam turbine 1 and a gas turbine 2, each driving an electric generator (not shown). The steam turbine 1, divided into a high-pressure section 11 and a low-pressure section 12, is supplied with steam from a steam generating unit 3 comprising a combustion chamber 4 that is heated by the combustion of any desired fuel, introduced through burners (not shown), in a stream of a gas supporting combustion, more specifically, exhaust gas from gas turbine 2. The combustion gases leaving chamber 4 pass into a first lateral, then descending duct 6 containing a superheater 7, reheater 8 and economizer 9, and ending in a stack, either directly or possibly through an interposed suction fan (not shown). After passing through the economizer 9, the feedwater delivered by a feed pump 10 enters the water-and-steam drum 14 which supplies, in the usual way, the steam generating tubes lining the walls of combustion chamber 4. The saturated steam from drum 14 is superheated in superheater 7 and is then passed to the high-pressure stage 11 of the turbine. The steam expanded therein is again heated as it passes through reheater 8 before being admitted to the low-pressure stage 12 of the turbine.

The exhaust steam from the low-pressure stage 12 is conveyed to a condenser 15. The condensing water is drawn from the condenser by a condensate-removal pump 16 and piped to a water collector system 17 at whose outlet the suction of the boiler feed pump 10 is located.

The water collector system 17 comprises a conventional row of series-connected exchangers 21, 22 and 23 for successive feedwater preheating, each of these exchangers being fed hot fluid from turbine extraction points 31, 32 and 33. Exchangers 31A, 32A and 33A, located in the respective bleed lines, provide for desuperheating and possibly partial condensation of the steam extracted before it is introduced into the associated feedwater-preheating exchanger, where it is completely condensed. Return connections 23A, 22A and 21A provide in the usual way for the return of the condensate to condenser 15.

The gas turbine 2 is fed hot gas under pressure from a combustion chamber under pressure, 24, into which the liquid or gaseous fuel delivered by a pump 25 is blown through a burner 26, while air for combustion is supplied by a compressor 27, which may be of any suitable type.

In accordance with the invention, the compressed air, after leaving compressor 27 and before entering combustion chamber 24, passes serially through exchangers 31A, 32A, and 33A in which it is preheated, while the bled steam passing through these exchangers desuperheated and partially condensed. The number of desuperheating exchangers such as 31A, 32A and 33A through which the air delivered by the compressor passes and which thus serve as preheaters may vary, and these exchangers may be of any suitable type, particularly of the one-piece tube design, and may be connected in series, parallel, or series-parallel, whichever is preferred in a given installation.

Studies of installations so designed have shown that preheating the air of the gas cycle by desuperheating bleed from the steam cycle results in an increase in the percentage-wise over-all efficiency of the plant.

In practice, this method of improving plant efficiency can be adapted in various ways and with similar benefits to other types of installations operating on a combined gas-steam cycle, as indicated by the embodiments shown diagrammatically in FIGS. 2 and 3.

In the embodiment shown in FIG. 2, a steam turbine 41 is served by a boiler 42 whose generating tube bundle 43 and superheating tube bundle or bundles 44 receive their heat from a pressurized furnace 45, which simultaneously serves as furnace for the gas cycle. In fact, this furnace, supplied with fuel by a pump 46 and with air by a compressor 47, is the source of the hot gas under pressure which feeds the gas turbine 48. The gases expanded therein pass through an exchanger 49 before being conducted at 50 to the stack. Exchanger 49 serves as economizer for evaporator unit 42, where the cool fluid is the feedwater of evaporator unit 42, coming from condenser 51 of turbine 41 by way of a water collecting station represented by exchanger 52. This exchanger is connected to an extraction point 53 by way of an exchanger 54 in which the steam bled from turbine 41 is desuperheated with partial condensation in contact with air delivered by compressor 47, which is heated before passing into furnace 45.

As a variant of this arrangement, the exchanger 49 might comprise a low-pressure steam generator serving, for example, a low-pressure stage of turbine 41.

In another embodiment shown in FIG. 3, the steam turbine, which has a high-pressure stage 61 and a low-pressure stage 62, receives steam from a boiler 63, whereas the superheater 64 and the reheater 65 are associated with a pressurized furnace 66, which burns a liquid or gaseous fuel delivered by a pump 67 in compressed air furnished by a compressor 68. This furnace supplies gas turbine 70 with hot gases under pressure, and the gases expanded in said turbine subsequently pass through an exchanger 71 (low-pressure economizer and/or evaporator) before being discharged at 72. Located between condenser 74 and the entrance to the economizer is the water collector system 75, supplied from turbine extraction point 76 and comprising a row of desuperheating exchangers 77, which here are shown connected in parallel in the air circuit between the delivery side of compressor 68 and the entrance to furnace 66.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

A combined gas-steam turbine cycle power plant comprising a steam generating unit, a separate pressurized furnace including a burner means spaced from said steam generating unit, a superheater arranged to receive heat within said pressurized furnace, means for passing steam from said steam generating unit to said superheater in said pressurized furnace, a high pressure steam turbine arranged to receive superheated steam from said superheater, a reheater arranged within said pressurized furnace to receive and reheat exhaust steam from said high pressure steam turbine, a low pressure steam turbine arranged to receive reheated steam from said reheater, a condenser arranged to receive and condense exhaust steam from said low pressure steam turbine, a first conduit for bleeding superheated steam from said high pressure steam turbine at an intermediate point in its passage therethrough, a second conduit for bleeding reheated steam from said low pressure turbine at an intermediate point in its passage therethrough, a first heat exchanger located in each of said first and second conduits, an air compressor, means for passing compressed air from said compressor in parallel through said first heat exchangers in heat exchange relationship with steam bled from said high pressure and low pressure steam turbines respectively and thence to said pressurized furnace for combustion therein with fuel to provide combustion gases, a second heat exchanger located in each of said first and second conduits downstream from said first heat exchangers, means for passing condensate from said condenser serially through said second heat exchangers in heat exchange relationship with the bled steam from said high pressure and low pressure turbines, means for passing the bled steam from said second heat exchangers to said condenser, a gas turbine, means for passing exhaust heating gas from said pressurized furnace through said gas turbine, duct means for passing exhaust heating gas from said gas turbine to the atmosphere, a third heat exchanger arranged in said duct means, and means for passing heated condensate from said second heat exchangers through said third heat exchanger in heat exchange relationship with the exhaust heating gases from said gas turbine and thence to said steam generating unit whereby the condensate receives additional heat and the exhaust heating gases are cooled.

References Cited in the file of this patent

UNITED STATES PATENTS

| | | |
|---|---|---|
| 2,294,700 | Stroehlen | Sept. 1, 1942 |
| 2,568,787 | Bosch | Sept. 25, 1951 |
| 2,653,447 | Heller | Sept. 29, 1953 |
| 3,032,999 | Pacault | May 8, 1962 |

FOREIGN PATENTS

| | | |
|---|---|---|
| 197,637 | Austria | Oct. 15, 1957 |
| 213,606 | Australia | Sept. 12, 1957 |
| 216,896 | Australia | Mar. 20, 1958 |
| 203,288 | Austria | Oct. 15, 1958 |